(12) United States Patent
Gleason et al.

(10) Patent No.: US 6,295,498 B1
(45) Date of Patent: Sep. 25, 2001

(54) DYNAMIC LOAD COMPENSATION METHOD FOR AN AUTOMATIC TRANSMISSION SHIFT PATTERN

(75) Inventors: Sean E Gleason, Indianapolis, IN (US); David W Wright, White Lake, MI (US); Peter Edwin Swingler, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/576,560

(22) Filed: May 22, 2000

(51) Int. Cl.$^7$ .................................................. B60K 41/06
(52) U.S. Cl. ............................................. 701/55; 477/121
(58) Field of Search ............................... 701/55, 51, 110, 701/66, 64, 79, 95; 477/121, 111, 115, 120, 901, 905, 92, 900, 130, 154

(56) References Cited

U.S. PATENT DOCUMENTS

| | | | |
|---|---|---|---|
| 4,070,927 | 1/1978 | Polak | 74/765 |
| 5,172,609 | 12/1992 | Nitz et al. | 74/866 |
| 5,245,893 | 9/1993 | Koenig et al. | 74/861 |
| 5,289,740 | * 3/1994 | Milunas et al. | 74/866 |
| 5,517,410 | * 5/1996 | Nakagawa et al. | 364/424.1 |
| 5,601,506 | 2/1997 | Long et al. | 475/120 |
| 5,623,408 | * 4/1997 | Motamedi et al. | 364/424 |
| 6,030,315 | * 2/2000 | Bellinger | 477/121 |
| 6,085,139 | * 7/2000 | Nakauchi et al. | 701/52 |
| 6,098,004 | * 8/2000 | Grytzelius et al. | 701/55 |

* cited by examiner

*Primary Examiner*—Tan Nguyen
*Assistant Examiner*—Dalena Tran
(74) *Attorney, Agent, or Firm*—Laura C Wideman

(57) ABSTRACT

An improved transmission shift pattern control that preserves the attributes of a selected base shift pattern while dynamically adjusting the high throttle shift thresholds based on a measure of vehicle loading. Heavy vehicle loading is detected by recognizing a pattern of high engine throttle and lower than expected vehicle acceleration, and the high power shifting thresholds are dynamically adjusted based on the detected loading to automatically provide aggressive shifting in a heavily loaded vehicle without producing excessive shift cycling in a normally or lightly loaded vehicle. A throttle timer is used to detect a condition of sustained high throttle operation, and under such condition, an acceleration timer determines the duration of lower than expected acceleration. If the determined duration exceeds a threshold, a shift pattern override is activated until the acceleration rises above an exit threshold. The severity of the loading condition may be determined with multiple acceleration timers used to activate successively more aggressive shift pattern overrides.

14 Claims, 3 Drawing Sheets

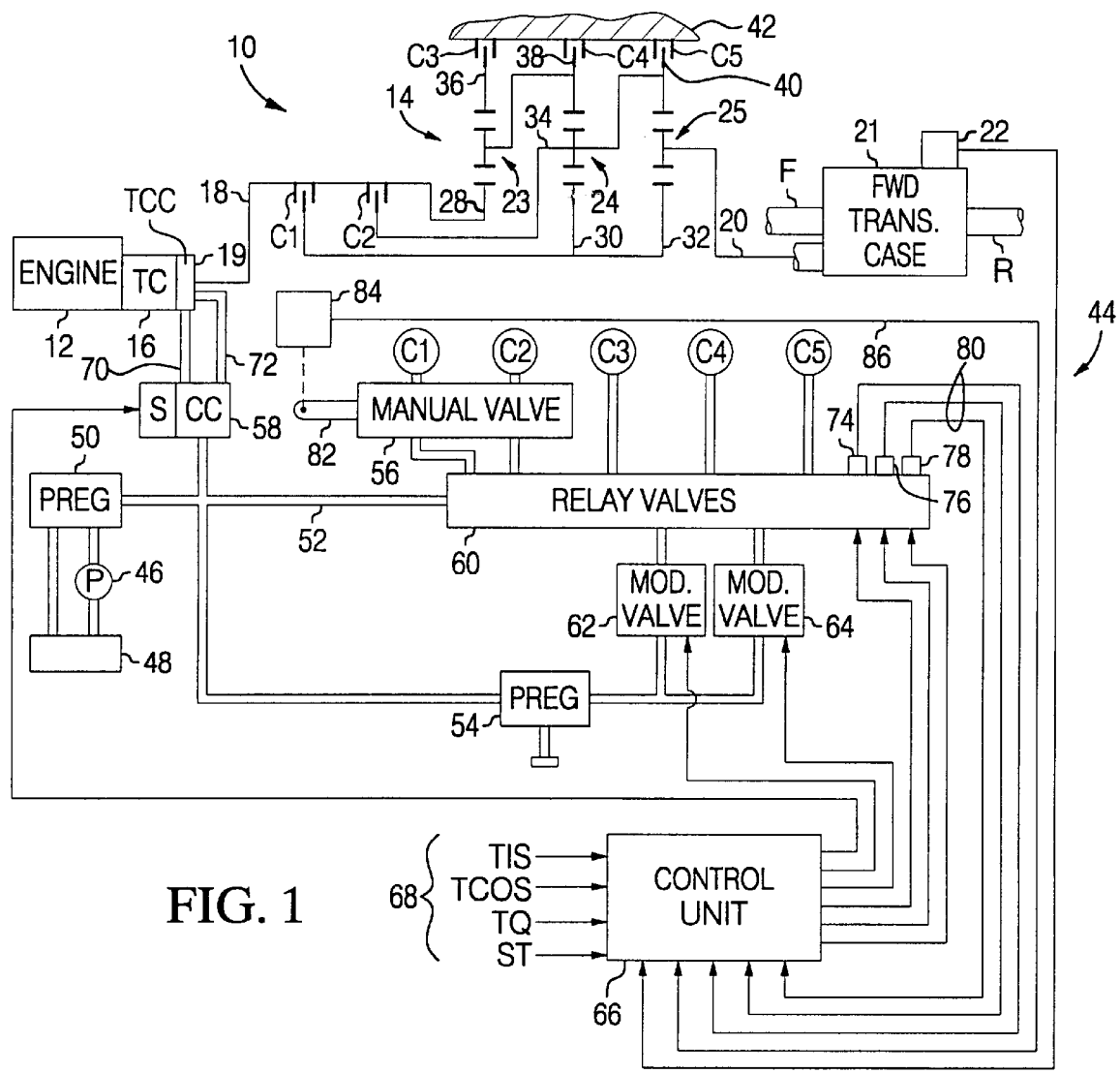

DYNAMIC LOAD COMPENSATION METHOD FOR AN AUTOMATIC TRANSMISSION SHIFT PATTERN

TECHNICAL FIELD

This invention relates to electronic transmission controls for motor vehicles, and more particularly to a control for dynamically adjusting a shift pattern to compensate for vehicle loading.

BACKGROUND OF THE INVENTION

Shifting from one speed ratio to another in an automatic transmission is generally initiated based on load (as judged by engine throttle position) and engine or transmission output speed. In an electronic control, speed and load dependent thresholds (referred to collectively as a shift pattern) are stored in a look-up table, and the actual speed and load are periodically determined and compared to the stored thresholds to determine if a shift should be initiated. To provide hysteresis, separate thresholds are provided for upshifting and downshifting, with an upshift being initiated when the speed/load point rises above the upshift threshold, and a downshift being initiated when the speed/load point falls below the downshift threshold.

An example of a shift pattern is given by the solid traces in FIG. 3, where the trace 80 represents an upshift threshold for upshifting from $1^{st}$ gear to $2^{nd}$ gear, and the trace 82 represents a downshift threshold for downshifting from $2^{nd}$ gear to $1^{st}$ gear. When $1^{st}$ gear is engaged, the transmission controller can look-up a 1–2 speed threshold based on engine throttle position using trace 80, and initiate an upshift to $2^{nd}$ gear if and when the measured speed output speed exceeds the 1–2 speed threshold. Similarly, when $2^{nd}$ gear is engaged, the controller can look up a 2–1 speed threshold based on throttle position using trace 82, and initiate a downshift to $1^{st}$ gear if and when the measured output speed falls below the 2–1 speed threshold.

The stored shift pattern directly impacts vehicle performance, engine fuel economy and driveline noise, and the various thresholds are calibrated to reasonably satisfy these criteria under typical driving conditions, as much as possible. In electronically controlled transmissions, additional flexibility can be achieved by providing two or more different shift patterns, which can be selected by the driver depending on operating conditions (hilly terrain, for example) or simply driver preference. For example, in a "performance" setting, the traces 80 and 82 of FIG. 3 can be shifted up somewhat so that both upshifting and downshifting occur at higher speeds, for a given throttle setting. From the driver's viewpoint, this delays shifting to a higher gear, and provides earlier downshifting to a lower gear, thereby improving the vehicle performance at the expense of fuel economy and driveline noise. In an "economy" setting, the traces 80 and 82 can be shifted down somewhat to provide an opposite effect.

A problem with the above-described approach is that it fails to dynamically compensate for vehicle loading. The problem is particularly apparent in truck applications, where the vehicle may be heavily loaded during a one leg of a trip, and then lightly loaded in the next leg of the trip. A shift pattern appropriate for a heavily loaded vehicle will result in excessive shift cycling in a lightly loaded vehicle, whereas a shift pattern appropriate for a lightly loaded vehicle will result in insufficient performance in a heavily loaded vehicle. Choosing a more aggressive (performance) shift pattern for heavy loads is helpful, but fuel economy may suffer unnecessarily, and it may be unrealistic to assume that the driver will choose a load-appropriate shift pattern. For this reason, controls are sometimes invoked for overriding the selected shift pattern; see, for example, the U.S. Pat. No. 5,245,893 to Koenig et al., issued on Sep. 21, 1993, and assigned to the assignee of the present invention, which overrides the upshift threshold to prevent engine overspeeding during periods of high engine acceleration, and the U.S. Pat. No. 5,172,609 to Nitz et al., issued Dec. 22, 1992, and assigned to Saturn Corporation, which reduces shift cycling by inhibiting certain upshifts based on a measure of gradeability.

SUMMARY OF THE INVENTION

The present invention is directed to an improved transmission shift pattern control that preserves the primary attributes of a selected shift pattern while dynamically adjusting the high throttle shift thresholds based on a measure of vehicle loading. According to the invention, heavy vehicle loading is detected by recognizing a pattern of heavy engine load (throttle setting) and lower than expected vehicle acceleration, and the high power shifting thresholds are dynamically adjusted based on the detected loading to automatically provide aggressive shifting in a heavily loaded vehicle without producing excessive shift cycling in a normally or lightly loaded vehicle. A throttle timer is used to detect a condition of sustained high throttle operation, and under such condition, an acceleration timer determines the duration of lower than expected acceleration. If the determined duration exceeds a threshold, a shift pattern override is activated until the acceleration rises above an exit threshold. In a preferred embodiment, the severity of the loading condition is determined with multiple acceleration timers, which are used to activate successively more aggressive shift pattern overrides.

BRIEF DESCRIPTION OF THE DRAWINGS

FIG. 1 is a diagram of an automatic transmission and microprocessor-based control unit for carrying out the control of this invention.

FIG. 2 is a diagram indicating a relationship between transmission clutch activation and corresponding speed ratio.

FIG. 4 illustrates a shift pattern control, and FIG. 5 illustrates a control method used to dynamically activate and deactivate shift pattern overrides according to this invention.

DESCRIPTION OF THE PREFERRED EMBODIMENT

Figure 3:
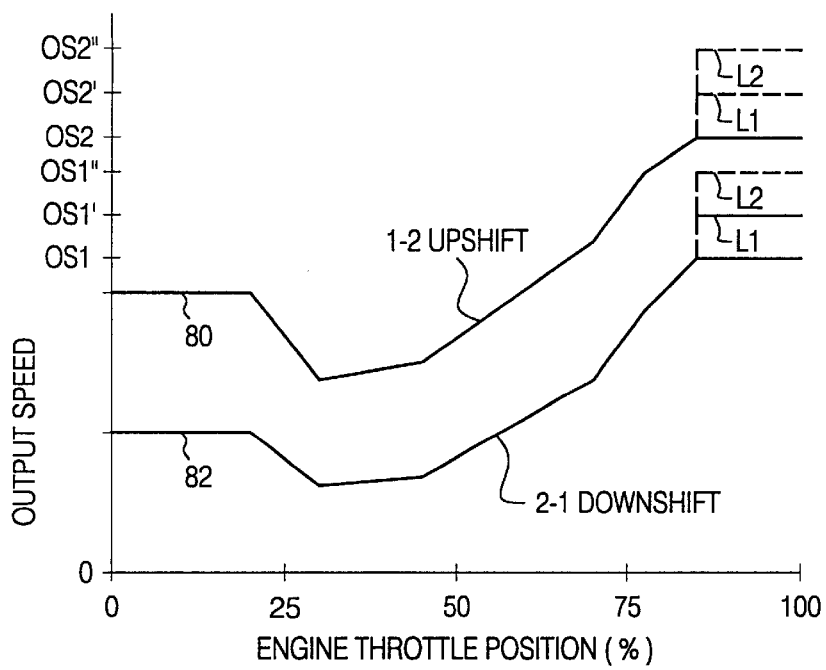
FIG. 3 is a graph illustrating a shift pattern control carried out by the control unit of FIG. 1 according to this invention.

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64. The electronic portion of the control is primarily embodied in the microprocessor-based control unit 66, which selects a desired transmission speed ratio based on engine load and output speed, and suitably activates the solenoid operated fluid control valves 58–64 based on a number of inputs 68 to achieve the desired speed ratio. The inputs 68 may include, for example, signals representing the transmission input speed TIS, the engine throttle TQ, and the transfer case output speed TCOS. Sensors for developing such signals may be conventional in nature, and have been omitted for simplicity. Additionally, the control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the supply fluid supply path to converter clutch 19 in lines 70, 72 for selectively engaging and disengaging the converter clutch 19. The control unit 66 determines pressure commands for smoothly engaging the oncoming clutch while smoothly disengaging the off-going clutch, develops corresponding force motor current commands (Icmd), and then supplies current to the respective force motors in accordance with the current commands.

The present invention is particularly directed to the selection of the desired speed ratio for transmission 14. As described above, the desired or commanded speed ratio is selected as a function of current speed ratio, engine throttle and transmission output speed using a stored shift pattern typified by the 1–2 upshift and 2–1 downshift thresholds depicted in FIG. 3 by the solid traces 80 and 82, respectively. In a usual implementation, the control unit 66 addresses the shift pattern table as a function of engine throttle to determine an upshift speed (if available) which the output speed must exceed to trigger an upshift to the next higher speed ratio, and a downshift speed (if available) which the output speed must fall below to trigger a downshift to next lower speed ratio.

As demonstrated above, the shift pattern effectively limits which of the six transmission speed ratios are available at any given combination of throttle setting and output speed. With the 2–1 downshift threshold (solid trace 82) in FIG. 3, for example, first gear is not available at a high throttle setting until the output speed falls below OS1. On the other hand, the 1–2 upshift threshold (solid trace 80) prevents the transmission from staying in first gear once the output speed reaches OS2. In practice, both situations limit the available power of the engine 12, and prevent the driver of a heavily loaded vehicle from being able to maintain a desired speed while climbing a hill, for example.

The present invention overcomes the above-described shift pattern limitations by detecting a pattern of high engine throttle setting and lower than expected vehicle acceleration, and dynamically adjusting the shift pattern thresholds as depicted by the broken traces in FIG. 3 to allow extended high throttle operation in a lower speed ratio than would otherwise be available. As soon as the acceleration reaches an exit threshold that is higher than the expected acceleration, the extended low speed ratio operation is no longer needed, and the shift pattern override is deactivated. As shown in FIG. 3, the illustrated embodiment provides two different override levels, designated by the labels L1 and L2 on the broken portion of traces 80 and 82. Depending on the severity of the loading condition, the shift pattern override is activated at level L1 or level L2 to provide suitable relief from the high throttle limitations of the normal shift pattern. When override level L1 is activated, for example, the 2–1 downshift threshold is raised from OS1 to OS1', allowing an earlier downshift to first gear while climbing grade, and the 1–2 upshift threshold is raised from OS2 to OS2', delaying the upshift to second gear. The override level L2 provides a similar, but more aggressive, effect.

Figure 4:
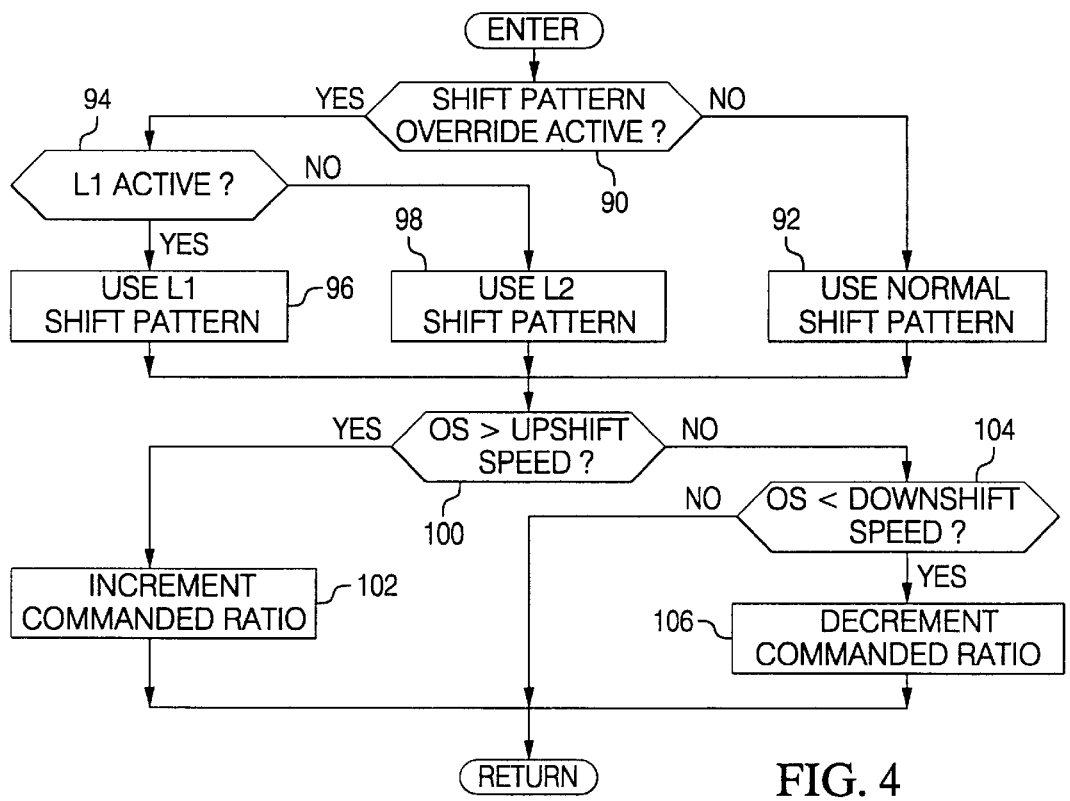
FIGS. 4 and 5 are flow diagrams representative of computer program instructions executed by the control unit of FIG. 1 in carrying out the control of this invention.
Figure 5:
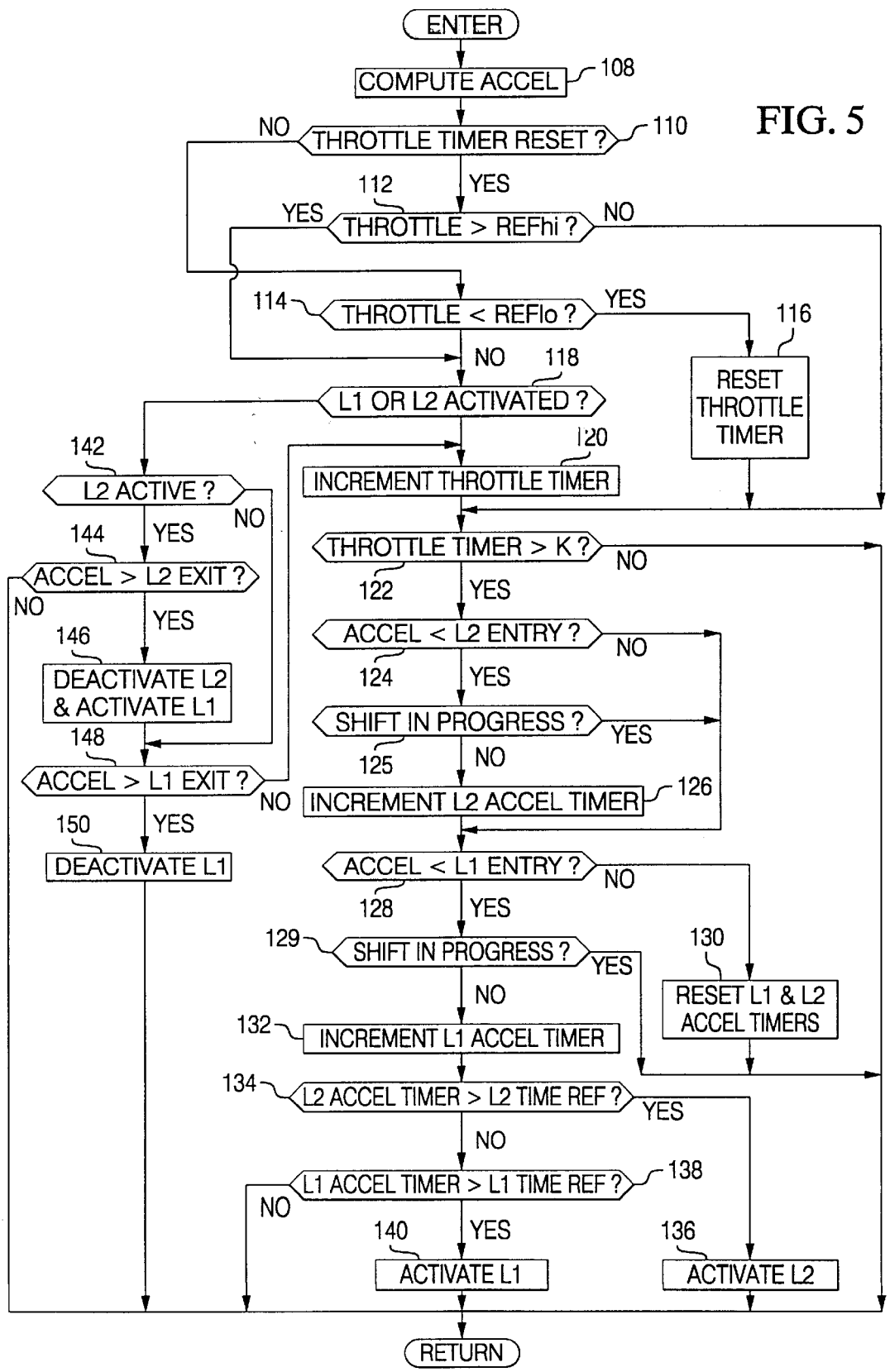

The flow diagrams of FIGS. 4 and 5 represent computer program instructions executed by the control unit 66 in carrying out the above-described control, which comprises only a small portion of the overall control of transmission 14. Thus, FIG. 4 may be considered as a routine that is periodically executed to determine the commanded speed ratio, and FIG. 5 may be considered as a routine that is periodically executed (at the same rate or a different rate) to dynamically activate or deactivate the shift pattern override at the suitable level L1 or L2.

Referring to FIG. 4, the block 90 is first executed to determine if the shift pattern override is active. If not, the block 92 is executed to look-up the upshift and downshift speeds based on the current speed ratio and the engine throttle position, using the normal shift pattern, as represented by the solid traces 80, 82 in FIG. 3. Although not illustrated, the control unit 66 may provide several "normal" shift patterns, one of which is selected as the pattern to be used for shift selection. If the shift pattern override is active at level L1, as determined by blocks 90 and 94, block 96 is executed to obtain the upshift and downshift speeds from the L1 shift pattern. And similarly, if the shift pattern override is active at level L2, as determined by blocks 90 and 94, block 98 is executed to obtain the upshift and downshift speeds from the L2 shift pattern. The different shift patterns may be implemented with separate look-up tables, if desired, or with suitable adjustment of the speeds obtained from the normal look-up table. If the output speed OS (which may be the transfer case output speed TCOS) exceeds the determined upshift speed, as determined at block 100, the block 102 increments the commanded speed ratio to initiate an upshift to the next higher speed ratio. Conversely, if the output speed OS is lower than the determined downshift speed, as determined at block 104, the block 106 decrements the commanded speed ratio to initiate a downshift to the next lower speed ratio.

Referring to FIG. 5, the block 108 is first executed to compute the vehicle acceleration. This may be measured directly if desired, or computed mathematically in a conventional manner based on the rate of change in output speed OS.

The blocks 110–120 are then executed to either increment or reset a throttle timer depending on the value of the engine throttle setting (THROTTLE) relative to two reference values REFlo and REFhi, representing high throttle settings such as 80% and 90%, respectively. Essentially, the throttle timer is incremented if THROTTLE>REFhi, and reset if THROTTLE<REFlo, with a hysteretic effect for throttle settings between REFhi and REFlo. First, block 110 determines if the throttle timer is reset; this determination is initially answered in the affirmative due to a reset of the throttle timer during vehicle start-up initialization. A reset condition indicates that the vehicle is not currently being operated in the high throttle condition, and the block 112 is executed to determine if THROTTLE>REFhi. If block 112 is answered in the affirmative, and the L2 override is not active (see description of blocks 118 and 142–150, below), the block 120 is executed to increment the throttle timer. In a subsequent execution of the routine, block 110 is consequently answered in the negative, and block 114 is executed to determine if THROTTLE<REFlo. If block 114 is answered in the negative, the throttle timer is incremented; if block 114 is answered in the affirmative, block 116 resets the throttle timer. Thus, the throttle timer is periodically incremented during a period beginning when THROTTLE exceeds REFhi, and ending when THROTTLE falls below REFlo, subject to the operation of blocks 118 and 142–150, described below.

The block 122 then compares the throttle timer count to a reference K corresponding to a predetermined time. Once the timer count exceeds K, the blocks 124–132 are executed to update the L1 and L2 acceleration timers based on the acceleration value determined at block 108. The L1 acceleration timer measures the duration of a low acceleration interval, and the L2 acceleration timer measures the duration of a very low acceleration interval. In each case, the acceleration timer is incremented beginning when ACCEL falls below a respective entry threshold (L1 ENTRY or L2 ENTRY), with L1 ENTRY>L2 ENTRY, and is reset when ACCEL subsequently reaches L1 ENTRY. The values L1 ENTRY and L2 ENTRY represent a minimum expected acceleration for high throttle operation, and are determined as a function of the currently commanded speed ratio and the "normal" shift pattern selected by the driver. Referring to the flow diagram, the L2 acceleration timer is incremented at block 126 if ACCEL<L2 ENTRY and no shift is in progress, as determined at blocks 124 and 125. Similarly, the L1 acceleration timer is incremented at block 132 if ACCEL<L1 ENTRY and no shift is in progress, as determined at blocks 128 and 129. Block 130 resets both acceleration timers when ACCEL subsequently reaches or exceeds L1 ENTRY, as determined at block 128.

The blocks 134–140 are then executed to compare the acceleration timer values to respective reference values L1 TIME REF and L2 TIME REF to determine if the shift pattern override should be activated. If the L2 acceleration timer exceeds L2 TIME REF, as determined at block 134, the block 136 is executed to activate the shift pattern override level L2. If block 134 is answered in the negative, but the L1 acceleration timer exceeds L1 TIME REF, as determined at block 138, the block 140 is executed to activate the shift pattern override level L1.

The blocks 142–150 are executed whenever a shift pattern override (L1 or L2) is active, as determined at block 118. If level L1 is active, as indicated by a negative outcome at block 142, the block 148 is executed to compare ACCEL to a level L1 exit threshold (L1 EXIT). If ACCEL>L1 EXIT, the block 150 is executed to deactivate the shift pattern override; otherwise, the override is maintained, and the blocks 120–140 are executed as described above to determine if level L2 should be activated. If level L2 is active, as indicated by a positive outcome at block 142, the block 144 is executed to compare ACCEL to a level L2 exit threshold (L2 EXIT). If ACCEL>L2 EXIT, the block 146 is executed to deactivate level L2 and to activate level L1; thereafter, the blocks 148–150 are executed as discussed above to determine if level L1 should remain activated. Thus, it will be seen that the override level L2 is given priority over the override level L1. The exit thresholds L1 EXIT and L2 EXIT are calibrated to values somewhat higher than the respective entry thresholds L1 ENTRY and L2 ENTRY to provide a desired amount of hysteresis.

In view of the foregoing, it will be seen that the control of this invention preserves the attributes of a base shift pattern while dynamically adjusting the high throttle shift thresholds based on a recognized pattern of heavy engine load and lower than expected vehicle acceleration, so as to automatically provide aggressive shifting in a heavily loaded vehicle without producing excessive shift cycling in a normally or lightly loaded vehicle. The throttle timer detects a condition of sustained high throttle operation (i.e., throttle timer>K), and under such conditions, the base shift pattern is overridden if one or both of the acceleration timers detect lower than expected acceleration (i.e., ACCEL<L1 ENTRY or L2 ENTRY) for at least a predetermined interval (L1 TIME REF or L2 TIME REF). As soon as the acceleration rises above a respective exit threshold (L1 EXIT or L2 EXIT), the base shift pattern is restored.

While the present invention has been described in reference to the illustrated embodiment, it is expected that various modification in addition to those mentioned above will occur to those skilled in the art. For example, a different number of override levels (more or fewer) could be used, and so on. Thus, it will be understood that methods incorporating these and other modifications may fall within the scope of this invention, which is defined by the appended claims.

What is claimed is:

1. A method of operation for a motor vehicle powertrain including an engine and a transmission providing a plurality of selectively engageable speed ratios through which the engine drives the vehicle, wherein upshifting and downshifting between said speed ratios is ordinarily initiated in response to a comparison of measured speed and load parameters with predetermined shift thresholds defined by a base shift pattern, the method comprising the steps of:

measuring a time duration of a first condition characterized by sustained engine load in excess of a predetermined load;

measuring a time duration of a second condition characterized by sustained acceleration below a first reference acceleration;

activating a first override of the base shift pattern to increase said predetermined shift thresholds when the measured time duration of the first condition exceeds a predetermined load time and the measured time duration of the second condition exceeds a first predetermined acceleration time.

2. The method of operation of claim 1, wherein the step of measuring the time duration of the first condition includes the steps of:

incrementing a load counter whenever a measured engine load exceeds an entry threshold;

resetting the load counter whenever the engine load falls below an exit threshold; and comparing a count of the load counter to a reference count corresponding to said predetermined load time.

3. The method of operation of claim 1, wherein the step of measuring the time duration of the second condition includes the steps of:

incrementing an acceleration counter whenever a measured vehicle acceleration falls below said first reference acceleration;

resetting the acceleration counter whenever the measured vehicle acceleration exceeds said first reference acceleration; and comparing a count of the acceleration counter to a reference count corresponding to said first predetermined acceleration time.

4. The method of operation of claim 1, including the step of:

deactivating the first override of the base shift pattern when the acceleration rises above a first exit threshold which is higher than said first reference acceleration.

5. The method of operation of claim 1, including the step of:

measuring a time duration of a third condition characterized by sustained acceleration below a second reference acceleration which is lower than said first reference acceleration;

activating a second override of the base shift pattern to increase said predetermined shift thresholds beyond the increase of said first override when the measured time duration of the first condition exceeds said predetermined load time and the measured time duration of the third condition exceeds a second predetermined acceleration time which is longer than said first predetermined acceleration time.

6. The method of operation of claim 5, including the step of:

deactivating the second override of the base shift pattern when the acceleration rises above a second exit threshold which is higher than said second reference acceleration.

7. The method of operation of claim 1, wherein the first reference acceleration is determined based on a current speed ratio of the transmission.

8. A method of operation for a motor vehicle powertrain including an engine and a transmission providing a plurality of selectively engageable speed ratios through which the engine drives the vehicle, wherein upshifting and downshifting between said speed ratios is ordinarily initiated in response to a comparison of measured speed and load parameters with predetermined shift thresholds defined by a base shift pattern, the method comprising the steps of:

timing a duration of a first condition characterized by sustained engine load defined by entry and exit load thresholds;

so long as the timed duration of the first condition exceeds a reference load time, timing a duration of a second condition characterized by sustained acceleration below a first predetermined acceleration;

when the timed duration of the second condition exceeds a first reference acceleration time, activating a first override of the base shift pattern by increasing said predetermined shift thresholds to permit earlier downshifting and later upshifting than would otherwise be permitted by said base shift pattern.

9. The method of operation of claim 8, wherein the step of timing the duration of the first condition includes the steps of:

incrementing a load counter whenever a measured engine load exceeds an entry threshold;

resetting the load counter whenever the engine load falls below an exit threshold; and comparing a count of the load counter to a reference count corresponding to said reference load time.

10. The method of operation of claim 8, wherein the step of timing the duration of the second condition includes the steps of:

incrementing an acceleration counter whenever a measured vehicle acceleration falls below said first predetermined acceleration;

resetting the acceleration counter whenever the measured vehicle acceleration exceeds said first predetermined acceleration; and comparing a count of the acceleration counter to a reference count corresponding to said first reference acceleration time.

11. The method of operation of claim 8, including the step of:

deactivating the first override of the base shift pattern when the acceleration rises above a first exit threshold which is higher than said first predetermined acceleration.

12. The method of operation of claim 8, including the steps of:

measuring a duration of a third condition characterized by sustained acceleration below a second predetermined acceleration which is lower than said first predetermined acceleration;

activating a second override of the base shift pattern to increase said predetermined shift thresholds beyond the increase of said first override when the duration of the third condition exceeds a second predetermined acceleration time which is longer than said first predetermined acceleration time.

13. The method of operation of claim 12, including the step of:

deactivating the second override of the base shift pattern when the acceleration rises above a second exit threshold which is higher than said second predetermined acceleration.

14. The method of operation of claim 8, wherein the first predetermined acceleration is determined based on a current speed ratio of the transmission.

* * * * *